United States Patent
Schofield (10) Patent No.: US 6,602,445 B2
(45) Date of Patent: Aug. 5, 2003

(54) METHOD FOR THE PREVENTION OF HIGH TEMPERATURES CORROSION DUE TO ALKALI SULFATES AND CHLORIDES USING MOLYBDENUM

(75) Inventor: Keith Schofield, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/209,360

(22) Filed: Jul. 31, 2002

(65) Prior Publication Data

US 2003/0014909 A1 Jan. 23, 2003

Related U.S. Application Data

(63) Continuation-in-part of application No. PCT/US01/03387, filed on Feb. 1, 2001, which is a continuation of application No. 09/505,007, filed on Feb. 15, 2000, now Pat. No. 6,328,911.

(51) Int. Cl.[7] .................... C23F 11/02; C23F 11/10; C23F 11/18; C10L 10/04
(52) U.S. Cl. .................... 252/389.54; 252/400.54; 422/194; 431/2; 431/3; 431/4; 431/8; 148/668
(58) Field of Search .................... 252/389.54, 400.54; 422/194; 431/4, 3, 2, 8, 115, 116; 148/668; 427/180, 190, 427

(56) References Cited

U.S. PATENT DOCUMENTS

| | | | | |
|---|---|---|---|---|
| 3,382,066 A | * | 5/1968 | Kenney et al. | 75/208 |
| 3,801,308 A | * | 4/1974 | Gustison | 75/129 |
| 3,841,929 A | | 10/1974 | Craig | |
| 4,008,090 A | * | 2/1977 | Miyake et al. | 106/43 |
| 4,075,376 A | | 2/1978 | Jaeger | |
| 4,463,061 A | | 7/1984 | Otoguro et al. | |
| 4,515,919 A | * | 5/1985 | Bradley et al. | 524/591 |
| 4,816,303 A | | 3/1989 | Kroenke et al. | |
| 4,831,942 A | * | 5/1989 | Morimoto et al. | 110/345 |
| 5,234,674 A | * | 8/1993 | Sommers | 423/345 |
| 5,240,741 A | | 8/1993 | Edwards, III et al. | |
| 5,489,346 A | | 2/1996 | Erickson | |
| 5,520,750 A | | 5/1996 | Riley | |
| 5,575,920 A | | 11/1996 | Freese et al. | |
| 5,747,665 A | | 5/1998 | Thompson | |
| 5,774,516 A | | 6/1998 | Hettiarachchi et al. | |
| 5,787,773 A | * | 8/1998 | Penoza | 83/13 |
| 5,802,955 A | | 9/1998 | Stoll et al. | |
| 5,821,441 A | | 10/1998 | Kawamura | |

OTHER PUBLICATIONS

M. Steinberg and K. Schofield; *The Controlling Chemistry in Flame Generated Surfaced Deposition of $Na_2SO_4$ and the Effects of Chlorine;* Twenty–Sixth Symposium of Combustion/The Combustion Institute, 1996; pp. 1835–1843.

K. Schofield; W2G07 *The Intriguing Flame Deposition Chemistry of Sodium Compounds and Its Implications for High Temperature Corrosion;* Poster at the 27th annual International Symposium on Combustion, in Boulder Colorado, USA, Aug. 1998.

* cited by examiner

*Primary Examiner*—Joseph D. Anthony
(74) *Attorney, Agent, or Firm*—Daniel L. Dawes; Myers Dawes Andras & Sherman LLP (57) ABSTRACT

An additive to a flame reaction forms noncorrosive deposits on cooler metal surfaces, which deposits are more stable than $Na_2SO_4$ or $K_2SO_4$. By adding molybdenum salts to the flame, an alkali polymolybdate is produced on the cooler metal surface and corrosion is inhibited. Deposition appears to closely reflect the relative thermodynamic stabilities of these salts. The flame processes all chemical molybdenum salt precursors as equivalent sources of molybdenum. The level of molybdenum required is equal to 2 times or more that of the alkali on an atomic basis in the flame environment. The nature of the fuel purity and possible alkali reduction schemes invoked will control the actual quantity and mixing method of the additive. The additive may be directly mixed into the fuel or injected into the burned gas regions of the combustor.

10 Claims, 6 Drawing Sheets

METHOD FOR THE PREVENTION OF HIGH TEMPERATURES CORROSION DUE TO ALKALI SULFATES AND CHLORIDES USING MOLYBDENUM

RELATED APPLICATIONS

The present application is a continuation-in-part of PCT Patent Application Ser. No. PCTUS/01/03387 filed on Feb. 1, 2001, which is incorporated herein by reference, which in turn is a continuation to U.S. patent application Ser. No. 09/505,007, filed on Feb. 15, 2000 now issued as U.S. Pat. No. 6,328,911.

BACKGROUND OF THE INVENTION

1. Field of the Invention

The invention relates to a method and apparatus for the prevention of high temperature corrosion due to alkali sulfates and chlorides in boilers and other fired apparatus.

2. Description of the Prior Art

The problem of high temperature corrosion in boilers and other types of fired apparatus has been appreciated for a very long time. Mainly because the process was not understood, however, attempts to find a solution were empirical or engineering make-do's. There have been several feasible attempts to consider fuel additives (E. Raask, Mineral Impurities in Coal Combustion: Behavior, Problems and Remedial Measures, 1985) and such species as magnesium, calcium or silica based compounds were added to little avail. Instead, for the last 20 years or so, attention has turned to accepting the presence of high temperature corrosion, but minimizing its effect on materials by developing superalloys or using coatings.

Even more recently in the United States, the higher temperature gas turbine developers have given in altogether and now will only burn very clean fuels such as natural gas. Coatings and alloys have been a great help but are only a partial solution as they all degrade with time. Chan, in a paper entitled "*Coating Life Prediction Under Cyclic Oxidation Combustion*," ASME J. Eng. Gas Turbines Power 120:609 (1998) formulates a coating lifetime model. What is more, all coatings and alloys must be prefabricated. They do not regenerate in use, but gradually degrade in an irreversible manner before finally failing. They generally are somewhat exotic and tough materials. These coatings are not flame components and it is not possible to create them in a normal combustion process. They are made by other techniques, prefabricated and then used. Coatings do not relate to flame chemistry or flame additives in any way. Consequently, patents relating to coatings or alloys are irrelevant to the invention.

The invention relates to flame deposition of alkali metal salts, primarily sodium and potassium salts, onto cooled metal surfaces immersed in the burnt gases. This has been one of the first quantitative studies and previously only qualitative engineering reports have been available. Nothing was previously known of the formation mechanisms or what were the controlling parameters. Some preliminary results are summarized in an earlier paper (26™ International Symposium on Combustion, 1996) and in a more recent one (Combustion and Flame 129:453, (2002)). However, these papers do not discuss the claimed invention, but only discuss the background of the invention.

BRIEF SUMMARY OF THE INVENTION

This invention is an extension to United States patent (Schofield, U.S. Pat. No. 6,328,911). The same technique is used but an additive of molybdenum salts rather than those of tungsten is invoked. The chemical interactions are very similar due to the close relationship between W and Mo in the periodic table.

An additive to a flame reaction is provided which forms noncorrosive deposits on cooler metal surfaces, which are more stable than $Na_2SO_4$ or $K_2SO_4$. The additive preferentially combines with the sodium or potassium, and sulfates of these are not formed. By adding molybdenum in the form of one of its salts to a flame, a polymolybdate is produced on the surface of a cooler metal object and corrosion is inhibited. Deposition appears to closely reflect the relative thermodynamic stabilities of these salts and follows the order, for example, $Na_2Mo_4O_{13}>Na_2Mo_{13}O_{10}>Na_2Mo_2O_7>Na_2MoO_4>Na_2SO_4>NaCl>Na_2CO_3$. The flame sulfur or chlorine does not remain on the surface in association with the alkali metal. Molybdenum can be added in any form desired to the combustion system. The flame processes all chemical molybdenum salt precursors as equivalent sources of molybdenum. Suitable salts that are readily available are ammonium paramolybdate, molybdenum oxides, organomolybdates or any other alkali-free molybdenum salt. The level of molybdenum needs to be twice or more that of the alkali in the specific flame environment based on atomic ratios. The nature of the fuel quality and possible alkali reduction schemes used in a practical combustor will control the quantity and mixing method of the additive. The additive may be directly mixed into the fuel or injected into the burned gas regions of the combustor. Molybdenum appears to be a viable alternative additive to tungsten.

The invention is thus a method of inhibiting corrosion in a flame reaction including an alkali metal comprising the steps of introducing an additive in the flame reaction, which additive forms a noncorrosive product with the alkali metal which is more chemically stable than sulfates of the alkali metal. The noncorrosive product is then deposited onto cooler metal structures in or proximate to the flame reaction in preference to or to the exclusive of more corrosive deposits which might otherwise be generated in the flame reaction.

The invention is also defined as the additive which is used for the foregoing method.

Generally, the alkali metal involved in the flame reaction is sodium (Na) or potassium (K). The additive includes molybdenum (Mo) in some form. When Mo is used, the noncorrosive product comprises a polymolybdate of the alkali metal.

The additive is preferably added to the flame reaction in a furnace, boiler, turbine or any combustion apparatus utilizing such fossil fuel. The additive may be added to the flame reaction in the form of ammonium paramolybdate, molybdenum oxides, organomolybdates or any other alkali-free molybdenum salt.

When the additive includes Mo, the amount of atomic Mo in the additive is at least 2 times as much as the amount of atomic metal alkali in the flame reaction.

The flame reaction is produced by combustion of a fuel. In one embodiment the additive is mixed in with the fuel prior to its combustion. In an other embodiment, the additive is injected into the combustion region or flame itself. Sulfur and chlorine can be included in the flame reaction without materially interfering with the desired end results.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

An additive to a flame reaction is provided which forms noncorrosive deposits on cooler metal surfaces which are more stable than $Na_2SO_4$ or $K_2SO_4$. The additive preferentially combines with the sodium or potassium and sulfates of these will not be formed. By adding molybdenum salts to the flame, an alkali polymolybdate is produced on the surface of the cooler metal object and corrosion is inhibited. Deposition appears to closely reflect the relative thermodynamic stabilities of these salts and follows the order, for example, $Na_2Mo_4O_{13}$>$Na_2Mo_3O_{10}$>$Na_2Mo_2O_7$>$Na_2MoO_4$>$Na_2SO_4$>NaCl>$Na_2CO_3$. The flame sulfur or chlorine do not remain on the surface in association with the alkali metal. Molybdenum can be added in any form desired to the combustion system. The flame processes all chemical molybdenum salt precursors as equivalent sources of molybdenum. Suitable salts that are readily available are ammonium paramolybdate, molybdenum oxides, organomolybdates or any other alkali-free molybdenum salt. The level of molybdenum required is equal to 2 times or more that of the alkali on an atomic basis in the specific flame environment. The nature of the fuel purity and possible alkali reduction schemes invoked will control the actual quantity and mixing method of the additive in a specific combustor case. The additive may be directly mixed into the fuel or injected into the burned gas regions of the combustor. Molybdenum appears to be an alternate additive to that of tungsten (Schofield, U.S. Pat. No. 6,328,911). The presence of calcium appears to be a potential interferant with this process. Its presence may require either enhanced levels of addition of molybdenum to match those of the alkali plus calcium, or as the calcium is present largely in particulate form in the burned gases, a particle reduction method.

It has been found according to the invention that the flame deposition process is totally controlled by the alkali in the reaction, and the rates depend in a linear manner on the flame concentration of total alkali content. It is to be expressly understood that sodium will be discussed at times herein as the representative alkali metal but that the invention applies to all the alkali metals. Any alkali metal could be similarly treated. The nature of the flame sodium is irrelevant and the flame processes all sodium salts as equivalent sources to each other. The sodium deposits in a very efficient manner on any surface immersed in the flame that is cooler than about 1250 K (1790° F.). Rates of deposition are independent of surface temperature up to about 1000 K and then fall off due to ablation processes. The alkali has a preference, however, as to what it forms on the surface. If sulfur is present in the flame at concentrations down to almost one half that of sodium, $Na_2SO_4$ is produced in a pure form.

The flame burner system used in the experiments discussed below is conventional and has been described previously in Steinberg, et al., *Twenty-Sixth Symposium (International) on Combustion,* The Combustion Institute, Pittsburgh, Pa., 1996, pp. 1835–1843, and provides for a well defined one dimensional atmospheric pressure flame. $C_3H_8/O_2/N_2$ and $H_2/O_2/N_2$ flames have been used over a range of fuel rich and lean equivalence ratios. In order to produce measurable probe deposition rates in a reasonable length of time (generally 1–6 hours), alkali flame concentrations of 10–50 ppm have been found most adequate. Metals are introduced as an aqueous aerosol from an ultrasonic nebulizer and solution strengths of about 0.05 N produce the required densities with minimal loss in the heated delivery line or heated burner. Solutions of sodium oxalate, $NaNO_3$, $KNO_3$, $Na_2MoO_4$, $K_2MoO_4$, ammonium paramolybdate $((NH_4)_6Mo_7O_{24})$ and $Ca(NO_3)_2$ have been used and found to be mutually compatible. In experiments with sodium, a trace addition of potassium was added to sodium solutions, K:Na=0.5%, to facilitate optical monitoring of the optically thin potassium resonance line emission as a measure of constant nebulizer delivery to the flame. Similarly in potassium experiments a trace of sodium was used. Small quantities of sulfur and chlorine were added from certified cylinder mixes of 0.1% $SO_2$ in $N_2$, and 514 ppm $Cl_2$ in $N_2$.

Several cylindrical collection probes have been used. These generally are about 12 mm in diameter and essentially interact with all of the seeded inner core burner flow at some point. They are of Inconel-600 stainless steel with a central channel for air or water cooling and have a built-in thermocouple to monitor the surface temperature. One was very tightly clad with a two micron thick foil of platinum. The probe was mounted horizontally in the vertical flows and the burner raised or lowered by a computerized stepper-motor. In this way samples could be collected at various downstream times. In the propane flames largely used in this program, times would generally be of the order of 3–5 ms from the reaction zone. Probe temperatures have been in the 700–850 K range.

Probe deposits have been characterized using a Nicolet Fourier transform Raman spectrometer that uses a 1.06 $\mu$m laser excitation source. After collecting a deposit on the probe, the flame is extinguished with ultrapure $N_2$ and the probe is cooled in such a flow. The sample then is removed while remaining in this flow and sealed in a capillary glass tube for analysis. Contact with moisture or air is minimal. Rates of deposition in this system are about 2 mg/hr of sodium and generally 5 mg are sufficient for an accurate spectral analysis. Rates of deposition were measured by dissolving the deposit off the probe and analyzing the solution for Na, K, S and other metals utilizing a Thermo Jarrell Ash High Resolution ICP using carefully matched calibration solutions. Analysis for certain metals such as Na, K and Ca also were run on a flame photometric Beckman analytical burner and values compared favorably with those acquired with the ICP. In such cases, monitoring sensitivity was very high, and accurate, reproducible results could be obtained for deposits collected in one hour.

Previous work has established that the alkali deposit that forms is totally controlled by the alkali metal and a preferential ranking exists that depends on whether the necessary ingredients are available in the burned flame gases. This preference has been found to follow the order $Na_2SO_4>NaCl>Na_2CO_3>NaOH$ (Steinberg and Schofield, *Proc. Combust Inst.* 26:1835 (1996), Combust. Flame 129: 453 (2002)). This level of understanding led to a solution, which was not foreclosed in any of the prior art references. Additives were tested in the endeavor to find one that the alkali would combine with in preference to sulfur and so form an alkali salt rather than $Na_2SO_4$ or NaCl. Additives of tungsten salts were shown to be an optimal choice as outlined in an initial Patent (Schofield, U.S. Pat. No. 6,328, 911, December 2001).

What was discovered was that the alkali formed polytungstates. Provided the atomic ratio of W:Na was equal to or greater than two-fold, a new ranking of $Na_2W_4O_{13}>Na_2W_2O_7>Na_2SO_4$ was established. Since the recording of that Patent, further experiments and analyses have reassessed whether any alternative possibilities exist. Not too surprising, only one other viable candidate has emerged. This involves molybdenum salts, not really unexpected as the chemistries of molybdenum and tungsten are very closely related, both being adjacent members of column VIB in the periodic table. A large number of experiments presented herein establish that it performs in an almost identical manner to tungsten and requires about the same levels of additive.

This Continuation in Part extends the previous Patent to include additives of molybdenum salts such as ammonium paramolybdate, molybdenum oxides, organomolybdates or any alkali-free molybdenum salt in the form of powders or solutions to the burned gases of combustors to alleviate corrosion resulting from alkali sulfates or chlorides.

Figure 1:
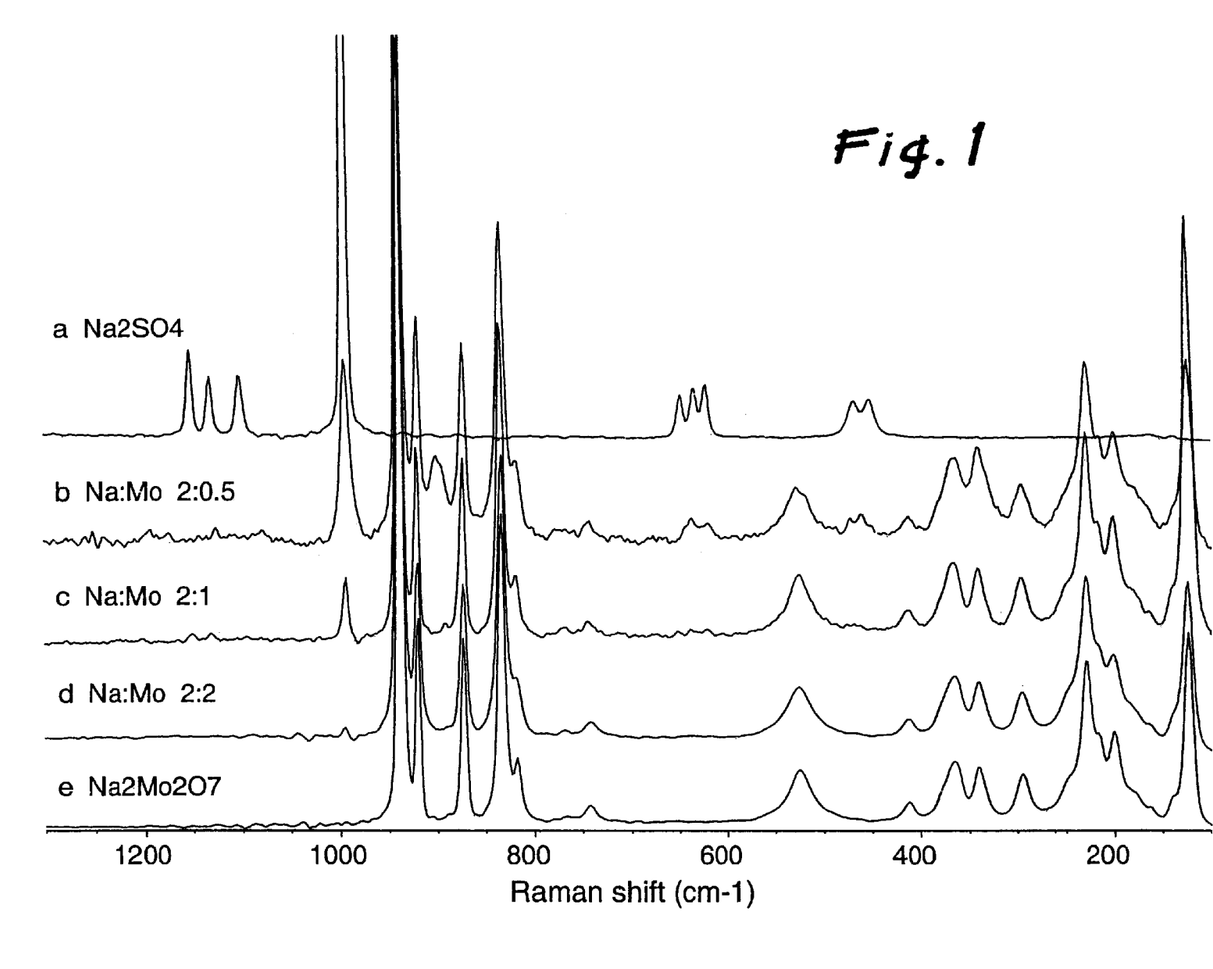
FIG. 1 is a graph of the Raman spectra of various deposits collected from propane flames containing sodium/molybdenum/sulfur and in one case also chlorine. It also shows the spectra expected for $Na_2SO_4$ and $Na_2Mo_2O_7$. As the ratio of Mo:Na increases in the flame, the observed $Na_2SO_4$ formation gradually decreases and when Na=Mo negligible $Na_2SO_4$ is produced.

FIG. 1 is a graph of the Raman spectra showing the effect of molybdenum addition on $Na_2SO_4$ deposition. Line a shows the Raman spectra (relative intensities) of a purchased sample of pure $Na_2SO_4$. Lines b), c), d) show the deposits collected on a platinum clad collection probe immersed in flame gases with increased additions of molybdenum salt. In particular, line b) is from a $C_3H_8/O_2/N_2$ (0.9/5/16) flame containing 75 ppm $SO_2$, 42 ppm Na and 10.5 ppm Mo, with the probe at 750 K and 4.1 ms downstream. Line c) is from a 0.9/5/14 flame with 44 ppm $SO_2$, 21 ppm Na and 10.5 ppm Mo, with the probe at 850 K and 3.1 ms downstream. Line d) is from a 0.9/5/16 flame with 75 ppm $SO_2$, 50 ppm $Cl_2$, 31 ppm each of Na and Mo, with the probe at 750 K, 5.2 ms downstream. Line e) is from a sample of $Na_2Mo_2O_7$ synthesized by heating either $Na_2CO_3/MoO_3$ or $Na_2MoO_4/MoO_3$ equimolecular mixtures at 900–1000 K for 14 hours.

FIG. 1 clearly shows the behavior of the addition of a molybdenum salt to a flame containing sodium, sulfur and chlorine. The Raman spectrum of $Na_2SO_4$, FIG. 1, line a), is simple and displays a strong line at 994 cm$^{-1}$. On adding molybdenum, $Na_2SO_4$ formation decreases and a more complex Raman spectrum is evident. This mirrors exactly that of $Na_2Mo_2O_7$ in FIG. 1, line e), synthesized in this laboratory because it cannot be readily purchased. Its spectrum agrees with previously published spectra of $Na_2Mo_2O_7$. A competition is evident between the sulfur and the molybdenum vying for the sodium. When the ratio of Na:Mo is 1:1, there is hardly any $Na_2SO_4$ produced, but rather pure $Na_2Mo_2O_7$. The FIG. 1, line d) flame contains both sulfur and chlorine and behaves identically whether the chlorine is present or not.

Figure 2:
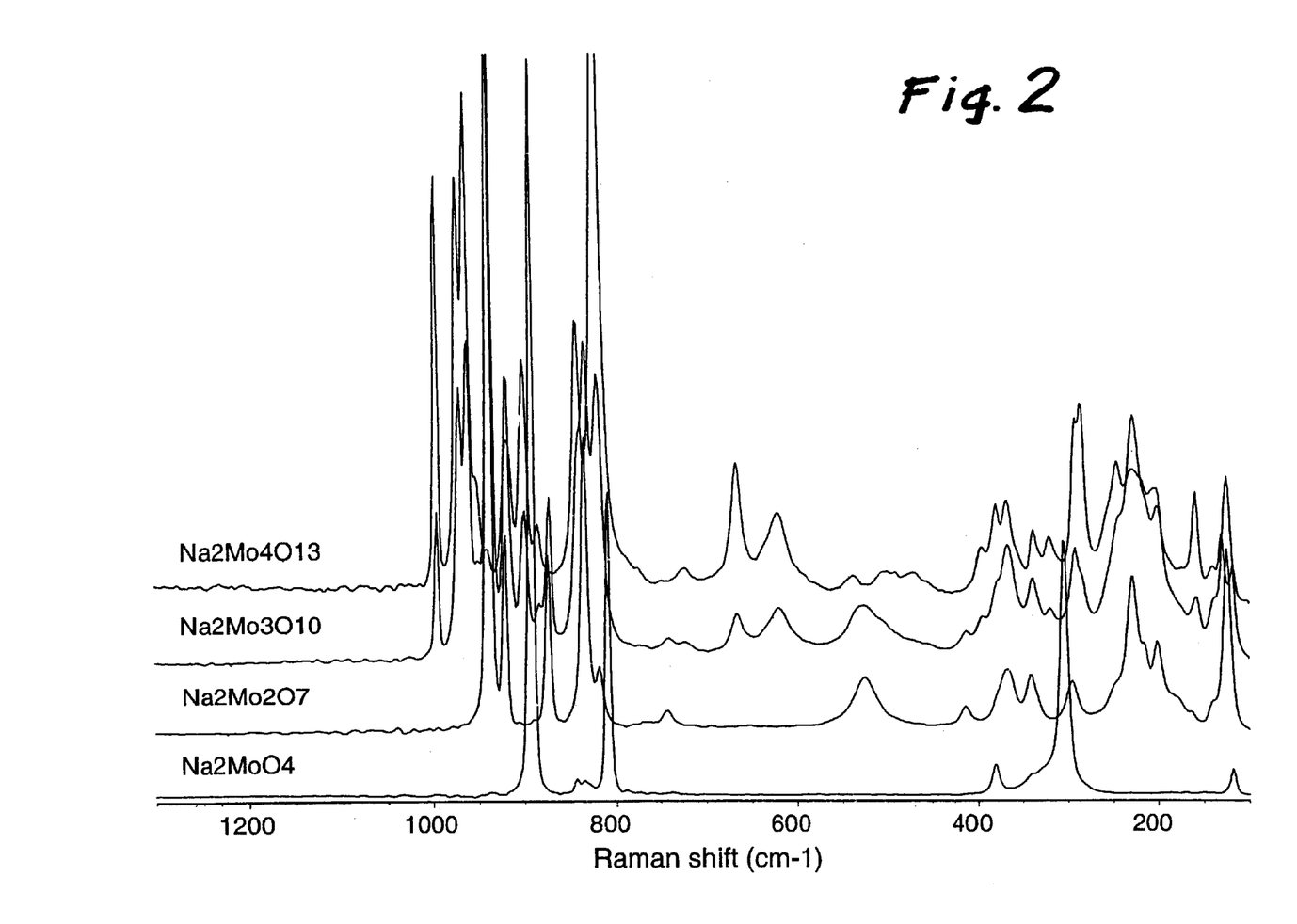
FIG. 2 is a graph of the Raman spectra of the salts $Na_2MoO_4$, $Na_2Mo_2O_7$, $Na_2Mo_3O_{10}$ and $Na_2Mo_4O_{13}$.

FIG. 2 is a graph of Raman spectra of $Na_2Mo_2O_7$, $Na_2Mo_3O_{10}$ and $Na_2Mo_4O_{13}$ synthesized by heating either $Na_2CO_3/MOO_3$ or $Na_2MoO_4/MoO_3$ in the correct molecular proportions until the two alternate methods produced spectra that agreed. The graph for $Na_2MoO_4$ used a high purity purchased sample. FIG. 2 illustrates the specific Raman spectra for sodium molybdate and the polymolybdates. These show the ease with which these deposited samples can be analyzed. Larger additions have not yet been examined for sodium. But by comparison with the behavior of potassium, that is reported later, it might be expected that excess molybdenum will probably produce $Na_2Mo_3O_{10}$ and $Na_2Mo_4O_{13}$.

Figure 3:
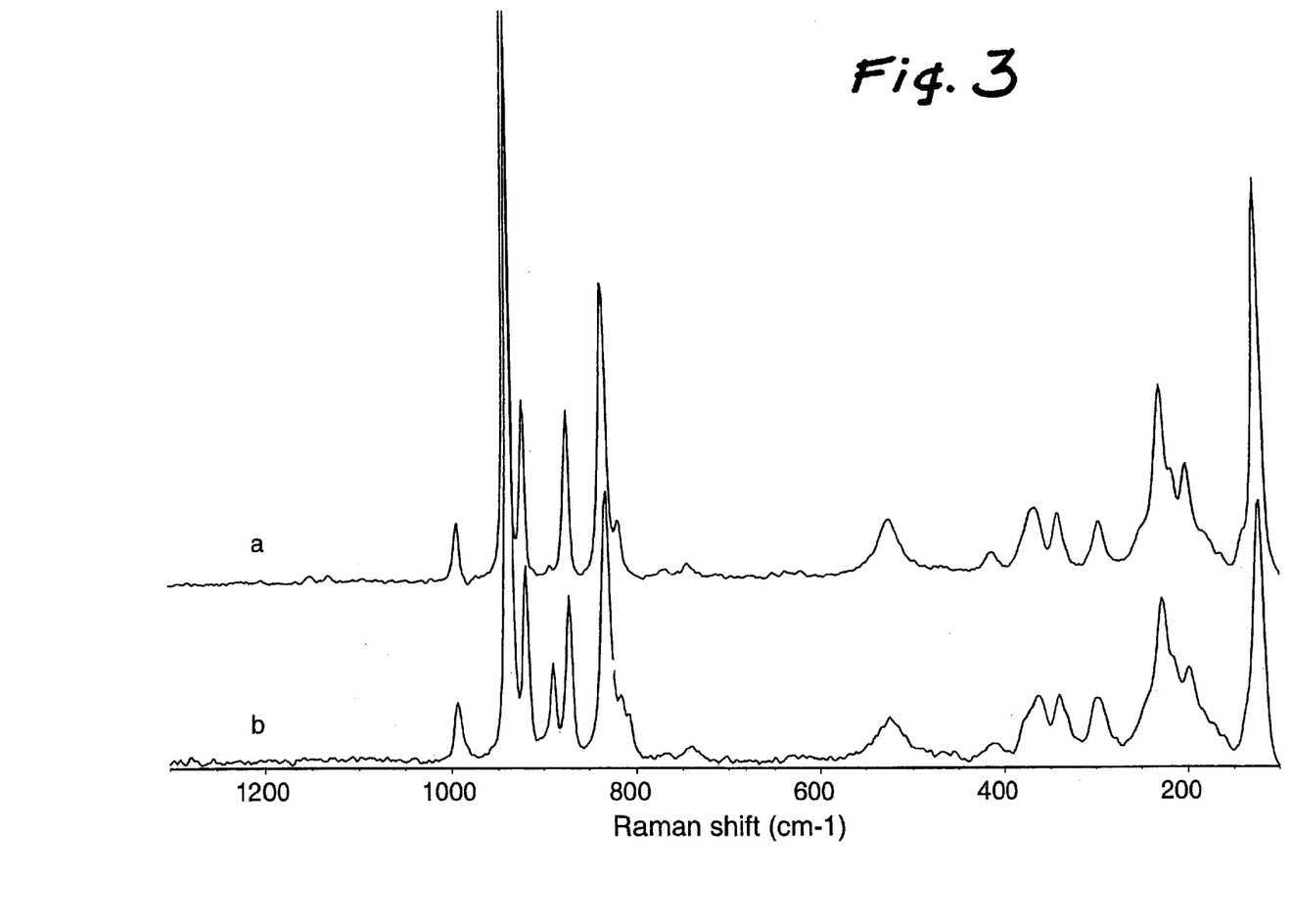
FIG. 3 is a graph of the almost identical Raman spectra observed in two experiments. In one case a flame generated deposit is collected on a probe immersed in a flame in which Na:Mo=2:1 with 44 ppm $SO_2$. In the other, the probe is initially coated directly with $Na_2MoO_4$ crystals and then immersed into the same flame but having no flame additives other than 75 ppm $SO_2$. Both samples are found to be $Na_2Mo_2O_7$, clearly showing that conversion occurs in the second case.

FIG. 3 is a graph of the Raman spectra in line a) of the flame generated deposit previously displayed as line c in FIG. 1 with flame concentrations of Na:Mo=2:1 and 44 ppm $SO_2$. For Line b) the probe is initially coated directly with $Na_2MoO_4$ crystals and then immersed in a $C_3H_8/O_2/N_2$ (0.9/5/16) flame with no additives other than 75 ppm $SO_2$. The probe was at 850 K and 4.8 ms downstream. A form of confirmation for this behavior is obtained by the experiments illustrated in FIG. 3. In this case, two differing approaches were used. The graph of line a) in FIG. 3 is the same experiment as already indicated in line c) of FIG. 1. Sodium and molybdenum salts are added in the ratio of 2:1 to a flame containing sulfur and the resulting deposit collected and analyzed. The second approach is to first coat the probe directly with $Na_2MoO_4$ crystals and then gradually insert it into a clean propane flame with no metal additives but with 75 ppm $SO_2$. In both cases a similar small amount of $Na_2SO_4$ is formed together with predominant $Na_2Mo_2O_7$. The conversion of the $Na_2MoO_4$ to $Na_2Mo_2O_7$ on the probe under the influence of $SO_2$ shows its dominant control with respect to the alkali. The small additional peak at 889 $cm^{-1}$ is unusual but coincides with the very strong single line of $K_2MoO_4$. It may result from such a potassium impurity in the sodium salt.

Figure 4:
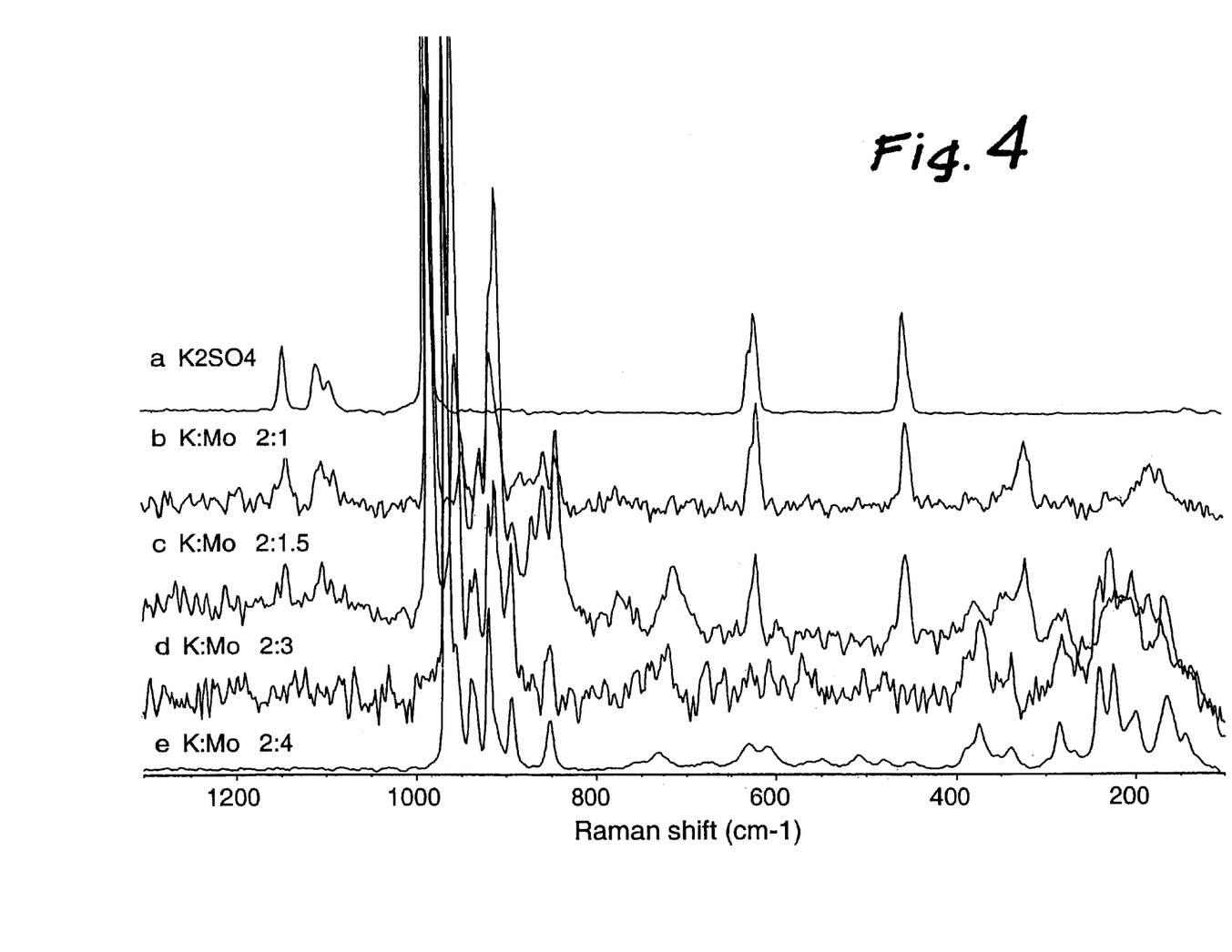
FIG. 4 is a graph of the Raman spectra of various deposits collected from propane flames containing potassium/molybdenum/sulfur. It also illustrates that of $K_2SO_4$. As the ratio of Mo:K increases in the flame the $K_2SO_4$ formation initially observed decreases and when K:Mo=1:2 no $K_2SO_4$ is formed at all.

FIG. 4 is a graph of the effect of molybdenum addition on $K_2SO_4$ deposition. Raman spectra of deposits collected on a platinum clad probe at 700 K (750 K in line b)), 5 ms downstream in fuel lean ø=0.9, $C_3H_8/O_2/N_2$ (0.9/5/16) with flames containing 75 ppm $SO_2$ and with K:Mo ratios as indicated. Mixtures of ammonium paramolybdate, $K_2MoO_4$ and $KNO_3$ solutions were used in the ultrasonic nebulizer. Flame potassium concentrations were 50 ppm for lines b) and c), 31 ppm in line d) and 16 ppm in line e). These spectra are compared to that of a pure sample of $K_2SO_4$.

Similar experiments also have been examined for potassium. FIG. 4 shows corresponding flame deposits that resulted from flames containing gradually larger quantities of molybdenum additive. They again show the significant decrease of $K_2SO_4$ formation at ratios of Mo:K of 1.5:1 and greater. $K_2SO_4$ has a Raman spectrum similar to that of $Na_2SO_4$ except that its major strong frequency transition is at 984 $cm^{-1}$ but its weaker frequencies at 620 and 456 $cm^{-1}$ are more pronounced. These clearly stand out in FIG. 4 finally disappearing totally from the spectrum if sufficient molybdenum salt is added.

Figure 5:
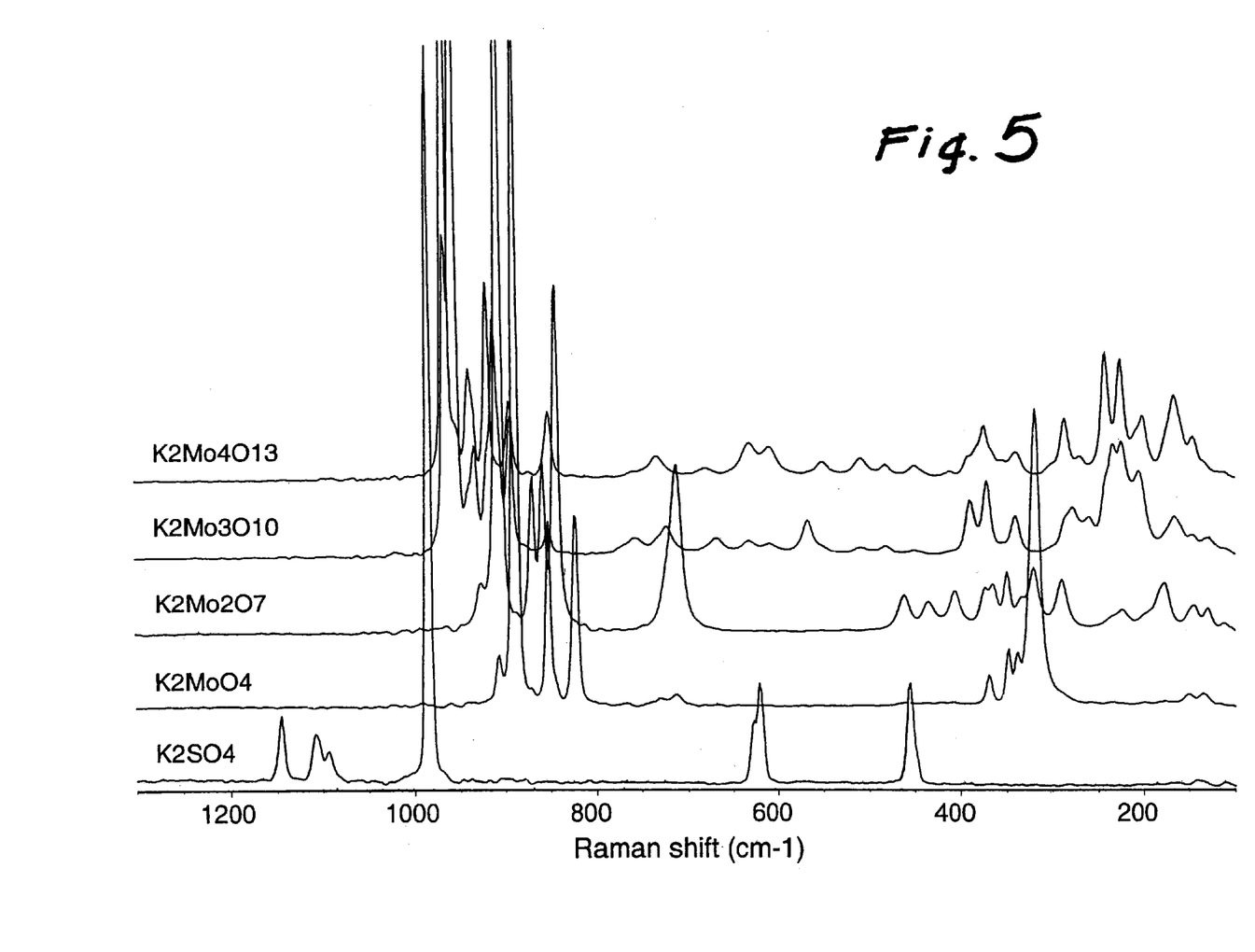
FIG. 5 is a graph of the Raman spectra of the salts $K_2MOO_4$, $K_2Mo_2O_7$, $K_2Mo_3O_{10}$ and $K_2Mo_4O_{13}$ together with that of $K_2SO_4$. These facilitate analysis of the deposits of FIG. 4 where it is seen that as the level of Mo increases in the flame, the deposit changes from being initially small amounts of $K_2MoO_4/K_2Mo_2O_7$, to $K_2Mo_2O_7/K_2Mo_3O_{10}$, to $K_2Mo_3O_{10}$ and finally to pure $K_2Mo_4O_{13}$ when K:Mo addition is 1:2.

FIG. 5 is a graph of the Raman spectra for $K_2Mo_2O_7$, $K_2Mo_3O_{10}$ and $K_2Mo_4O_{13}$ synthesized by heating either $K_2CO_3/MoO_3$ or $K_2MoO_4/MoO_3$ in the correct molecular properties at about 800 K for 40 hours when the two alternate methods produced spectra that agreed. Those for $K_2MoO_4$ and $K_2SO_4$ are from purchased samples. FIG. 5 illustrates the Raman spectra of potassium molybdate and polymolybdates. Their spectral patterns lie to shorter frequencies than the strong line of $K_2SO_4$ making identification relatively easy. What is evident is that when K:Mo ratios are 2:1 in the flame, FIG. 4, line b), $K_2SO_4$ still forms with a small amount of $K_2MoO_4$ and $K_2Mo_2O_7$. As the amount of molybdenum is increased, potassium polymolybdate formation increases forming $K_2Mo_2O_7/K_2Mo_3O_{10}$ in FIG. 4, line c), $K_2Mo_3O_{10}$ in FIG. 4, line d), and finally when K:Mo is 1:2, no $K_2SO_4$ is evident at all but a pure deposit of $K_2Mo_4O_{13}$ results.

These findings were additionally reinforced by an additional experiment. In this case, a deposit of $K_2SO_4$ initially was produced on the probe from a fuel-lean propane flame containing potassium, sulfur and chlorine. A molybdenum salt then was added to the nebulizer such that K:Mo=1:2 and the flame continued to deposit on top of the initial $K_2SO_4$. After burning for the same length of time the total deposit then was analyzed and showed a sample of $K_2SO_4$ and $K_2Mo_3O_{10}$. Although normally, as in FIG. 4, line e) and FIG. 5, a ratio of 1:2 should produce $K_2Mo_4O_{13}$, obviously some conversion of the initially lain down $K_2SO_4$ layer occurred, the molybdenum then being shared between the two layers and $K_2Mo_3O_{10}$ resulted as might be expected from the overall K:Mo=1:1 addition of the experiment.

Consequently, it appears that molybdenum reflects the chemistry of tungsten very closely and is also a viable additive to prevent the formation of $Na_2SO_4$, $K_2SO_4$, NaCl or KCl in combustion systems. Its addition quantity on an atomic basis is in amounts twice or more that of the alkali, similar to tungsten.

The presence of molybdenum salts in the burned gases disrupts the normal alkali/sulfur/chlorine chemistry in providing an ingredient that the alkali prefers and an alkali polymolybdate is formed. An additional question that has been addressed is whether the presence of any other species in a practical system might have a great affinity for molybdenum and interfere with its intended purpose. Thermochemical data are available in the literature for about thirty molybdates of various elements of the periodic table. These generally form only the simple molybdate. An assessment of their relative thermodynamic stabilities suggests that of these, only calcium, strontium and barium molybdates might be sufficiently stable to displace the alkali polymolybdates.

Figure 6:
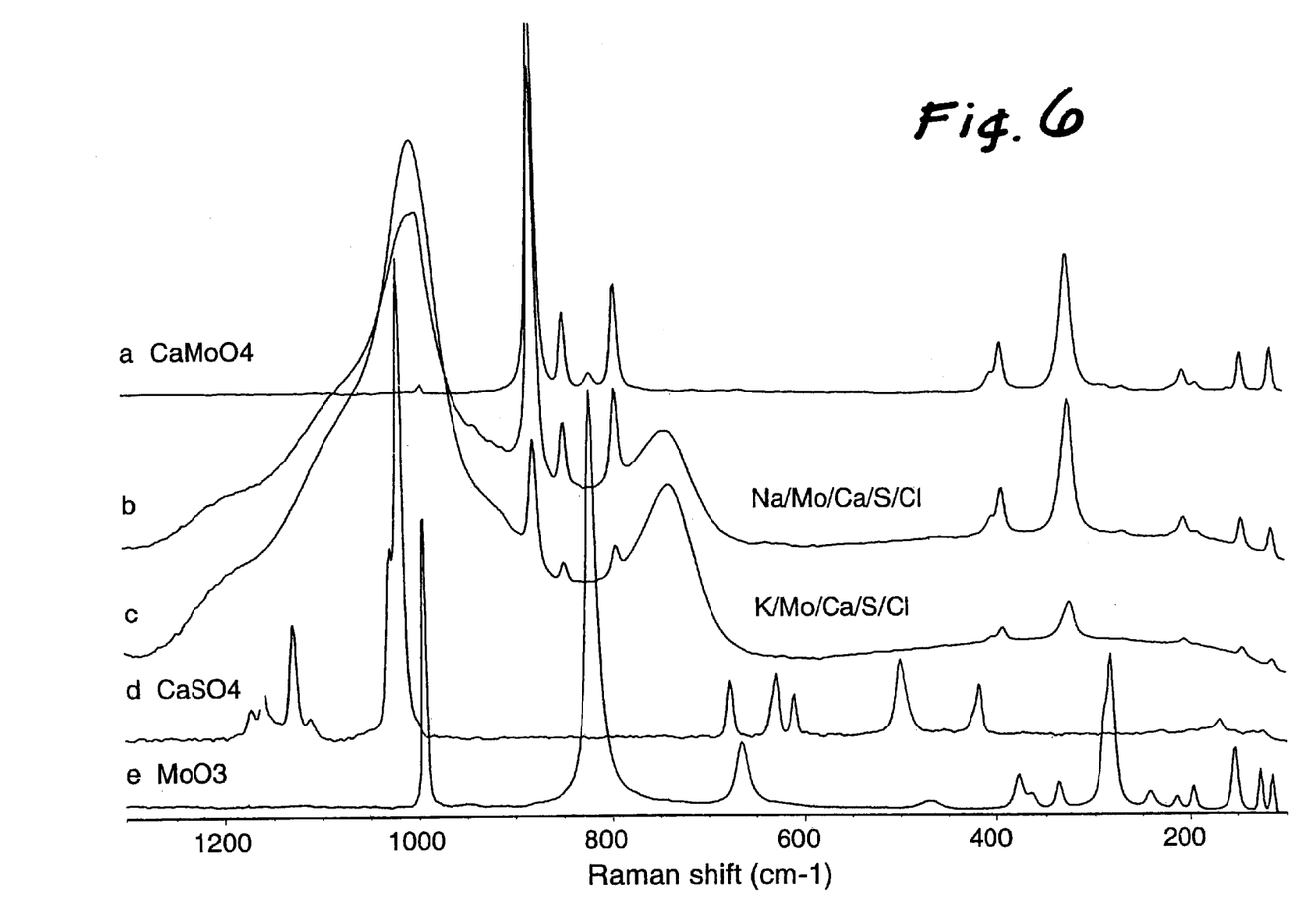
FIG. 6 is a graph of the Raman spectra of the deposits collected from propane flames in two cases. One when the flame contained Na/Mo/Ca/S/Cl and the other K/Mo/Ca/S/Cl. It also shows the spectra expected for $CaMoO_4$, $CaSO_4$ and $MoO_3$. It is clear that $CaMoO_4$ is being formed in the experiments indicating some interference by the presence of calcium. Such cases will need enhanced additive amounts of molybdenum or some pre-control of calcium emissions.

FIG. 6 is a graph of the Raman spectra of two deposits collected on a platinum clad probe, 4 ms downstream in fuel lean ø=0.9, $C_3H_8/O_2/N_2$ (0.9/5/16) with flames containing 75 ppm $SO_2$ and 50 ppm $Cl_2$. Line b) is for Na:Mo:Ca additive ratios of 1:1:1, 16 ppm each, probe at 750 K. Line c) is for K:Mo:Ca=1:2:2, potassium concentration 11 ppm, probe at 700 K. These are compared to spectra of purchased samples of $CaMoO_4$, $CaSO_4$ and $MoO_3$. FIG. 6 illustrates experiments to test this for the cases of sodium or potassium with calcium, molybdenum, sulfur and chlorine additions to a flame.

The conditions of FIG. 6, line b) are comparable to those of FIG. 1, line d) for Na/Mo/S/Cl additions. Whereas the product there was an essentially pure deposit of $Na_2Mo_2O_7$, a very different spectrum is observed in this case reflecting the characteristic peaks of $CaMoO_4$. The significant background seen in the spectrum results from a luminescent (fluorescent) interference seen previously with flame generated $CaSO_4$ samples. It disappears if the Raman spectra are recorded on another system utilizing a different excitation laser frequency, confirming its non-Raman nature. Exactly similar behavior is noted in FIG. 6, line c) for a corresponding experiment with potassium but for ratios of K:Mo:Ca of 1:2:2. This should reflect FIG. 4, line e) and a spectrum of $K_2Mo_4O_{13}$ except for this obvious interference where calcium is claiming the molybdenum. Clear evidence of the actual continued formation of $Na_2SO_4$ and $K_2SO_4$ is lost under the fluorescent background peak. An interference by calcium though is clear and will have to be taken into account.

Consequently, it does appear that calcium and possibly strontium and barium may pose interference problems. This may not be a significant difficulty in some combustion applications as these alkaline earths do react with other elements such as silicates forming particulates that can be removed from the burned gases. Otherwise, slightly larger additive levels of molybdenum might be necessary to convert both the alkali and alkaline earths to molybdates to fully mitigate alkali sulfate formation.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method of inhibiting corrosion in a flame reaction including an alkali metal comprising:

introducing at least one alkali-free molybdenum salt additive in the flame reaction, which additive forms a noncorrosive product with the alkali metal which is more chemically stable than sulfates of the alkali metal; and depositing the noncorrosive product onto cooler metal structures in or proximate to the flame reaction; with the proviso that the level of molybdenum is twice or more that of the alkali metal in the specific flame environment based on atomic ratios.

2. The method of claim 1 wherein the alkali metal is Na.

3. The method of claim 1 wherein the alkali metal is K.

4. The method of claim 1 wherein the noncorrosive product comprises a polymolybdate of the alkali metal.

5. The method of claim 1 wherein the additive is added to the flame reaction in a furnace, boiler, turbine or any combustion apparatus utilizing a fossil, syn-, or biofuel.

6. The method of claim 1 wherein the additive comprises ammonium paramolybdate, molybdenum oxides, any organo-molybdenum compound, or any other available alkali-free molybdenum salt.

7. The method of claim 1 wherein the flame reaction is produced by combustion of a fuel and wherein the additive is mixed in with the fuel prior to combustion.

8. The method of claim 1 wherein the flame reaction is produced by combustion of a fuel and wherein the additive is injected into the combustion.

9. The method of claim 1 wherein the flame reaction includes sulfur.

10. The method of claim 1 wherein the flame reaction includes chlorine.

* * * * *